Figure 1:
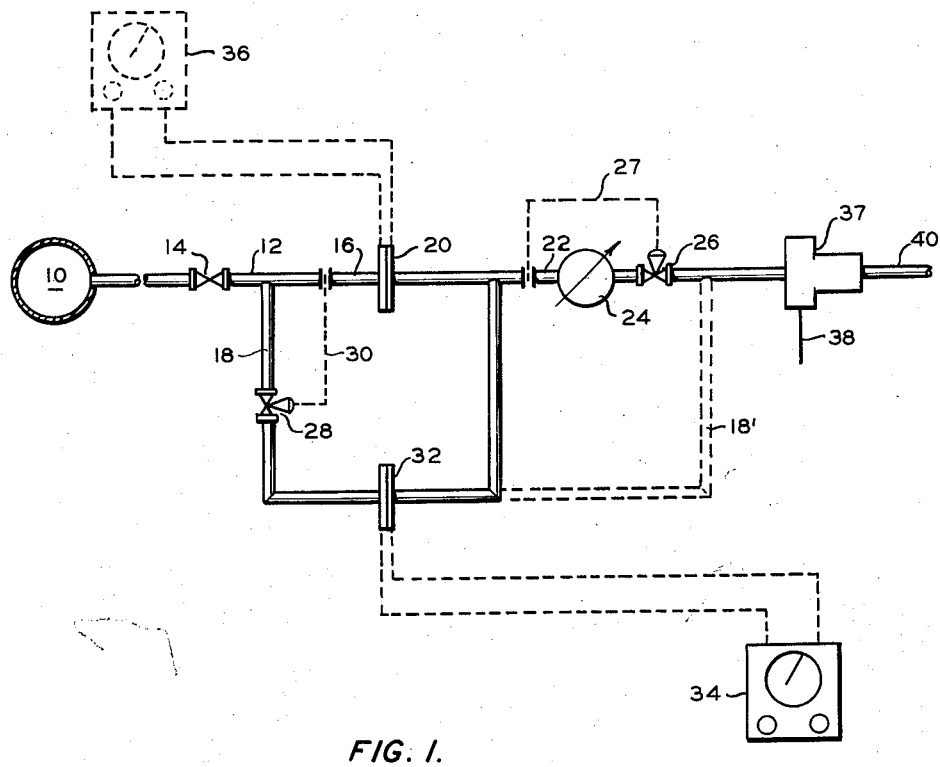

Dec. 2, 1958    G. J. WEBSTER    2,862,387
SHUNT LINE METERING TOTAL FLOW
Filed Dec. 9, 1954

INVENTOR.
G. J. WEBSTER
BY Hudson & Young
ATTORNEYS

2,862,387

SHUNT LINE METERING TOTAL FLOW

George J. Webster, Borger, Tex., assignor to Phillips Petroleum Company, a corporation of Delaware Application December 9, 1954, Serial No. 474,190

5 Claims. (Cl. 73—198)

This invention relates to apparatus for metering fluid flow.

In processes requiring relatively high fluid flow rates, difficulty in closely controlling small variations in the flow rate as required by the processes involved has been experienced. Small variations in a large flow rate are difficult to accurately measure so as to permit exact control of a varying feed rate to a process. One example of such a process is a carbon black producing process wherein oil is passed to a carbon black furnace or reactor at a relatively high rate which varies periodically as reaction conditions, characteristics of the oil, and other factors effecting the process are changed either by design or uncontrollably. In one carbon black producing process, orifice meters in the oil lines are equipped with circular square root charts which indicate the approximate flow through the line. The major disadvantage inherent in this system is in the low accuracy of the measurement of the flow rate to the furnace. In such a system the meter must record flows ranging from 0 to 350 gallons per hour. The charts are standard 10″ diameter charts showing a square root reading of 10 at full scale deflection and are graduated in 0.1 root divisions. Required variations in flow rate are determined by analysis of the effluent from the carbon black furnace and, as changes in oil flow rate are indicated, an operator changes the position of the feed valve so as to increase or decrease the flow rate in accordance with the desired feed rate indicated by the analysis. With this system the operator is unable to accurately make essential minor corrections in the oil rate to a reactor so as to operate at maximum efficiency in the carbon black process.

The principal object of the invention is to provide apparatus for accurately controlling fluid flow rate through a line. Another object is to provide apparatus for controlling the flow of fluid to a process requiring variable accurate flow rates. Another object is to provide apparatus for accurately controlling the flow of oil to a carbon black reactor. It is also an object of the invention to increase the accuracy in measuring changes in fluid flow at high rates. Other objects of the invention will become apparent from a consideration of the accompanying disclosure.

The broadest aspect of the invention comprises dividing the flow of fluid in a flow line into two streams, one carrying the bulk of the flow and the other carrying only a minor proportion of the total flow, and maintaining the major flow constant while varying the minor flow as flow requirements are varied. In this manner small variations in flow in the minor flow line produce sizable readings on a metering device which can be utilized in accurately varying the total flow of fluid in accordance with the changing requirements of any given process. With the system of the invention the main flow control valve can easily be operated to effect very small variations in the flow rate through the minor flow line with high accuracy and close control of the total flow rate in accordance with the requirements of the process to which the flow is directed.

Figure 2:
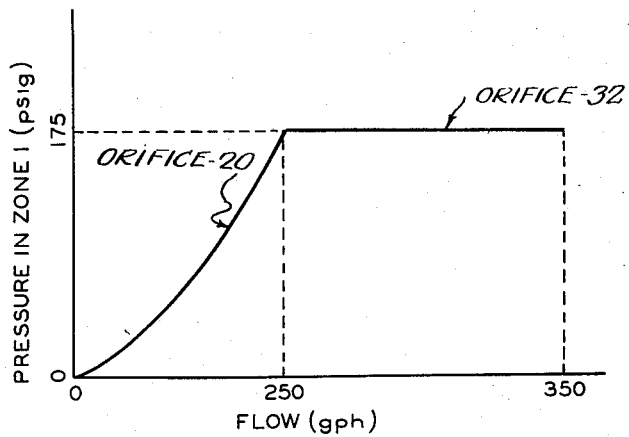

A more complete understanding of the invention may be had from a consideration of the accompanying drawing of which Figure 1 is a schematic plan view of one arrangement of the apparatus of the invention, and Figure 2 is a graph or chart showing the relation of flow in gallons to pressure in pounds when the apparatus of Figure 1 is operated under certain conditions.

Referring to Figure 1, a central oil supply or header 10 is connected to a feed line 12 having a main flow control valve 14 therein. Under high flow rates the flow from line 12 is split, a portion going to line 16 and the other portion to line 18. The flow through line 16 passes through a flow control orifice 20 and into line 22 in which are positioned a heater 24 and a back-pressure valve 26. Back-pressure valve 26 is responsive to the pressure in line 16 or 22 intermediate orifice 20 and valve 26.

Line 18, in effect, is a shunt line around orifice 20 and may have its downstream end connected with the flow line at any point downstream of orifice 20 such as shown by line 18′. A back-pressure valve 28 is positioned at any convenient point in line 18 and is responsive through line 30 to the pressure in the lines intermediate valves 14 and 28 and orifice 20. An orifice 32 at any suitable position in line 18 is connected with a metering device 34 for measuring and indicating the rate of flow through line 18. A similar metering device 36 may be used to indicate the flow through orifice 20, where desired, but this is not essential as the flow through line 16 is constant.

Oil line 22 leads into carbon black reactor 37 which is provided with air line 38 and effluent line 40. Reactor 37 may be of any type which burns a portion of the oil sufficient to pyrolytically crack the remaining portion to carbon.

In order to illustrate the operation of my flow control apparatus, it can be assumed that oil in header 10 is available at a constant pressure of 230 p. s. i. g. Valve 14 which may be an Adel valve or its equivalent is manually operated or controlled to obtain the desired flow rate at any time. This valve may be considered as the main throttle for controlling the flow of oil to an individual carbon black reactor or other element to which the flow is to be controlled. Orifices 20 and 32 are standard orifice plates of selected suitable size while valves 26 and 28 are standard back-pressure regulators. In the illustration at hand, valve 26 is adapted to hold a constant pressure of 100 p. s. i. g. in the lines between the valve and orifices 20 and 32, while valve 28 is adapted to hold a constant pressure of 175 p. s. i. g. in lines 16 and 18 and line 12 downstream of valve 14.

As valve 14 is partially opened, oil flows through orifice 20 only. Total flow continues to pass only through orifice 20 at rates between 0 and 250 gallons per hour, while the pressure in line 16 varies from 0 to 175 p. s. i. g. As valve 14 is further opened to increase the flow therethrough beyond 250 g. p. h., the pressure in line 16 tends to increase to more than 175 p. s. i. g. thus allowing all oil in excess of 250 g. p. h. to flow through orifice 32 where it is metered by meter 34. By this system only the last 100 g. p. h. are metered thereby increasing the accuracy 3½ times for this particular case. By varying the set pressure of valve 28 and/or valve 26 the accuracy in determining change in flow rate can be increased. If the setting of valve 28 is such that it holds a pressure sufficient to maintain a flow of 300 g. p. h. through orifice 20 and a total of 350 g. p. h. is desired, only approximately 50 g. p. h. flows through orifice 32, thereby further greatly increasing the accuracy of the flow control.

Valve 26 is essential to the system of flow control. Without this valve in the system it is not feasible to maintain constant flow through main flow line 16. In addition, oil preheater 24 is an indirect heat exchange heater provided with coils and these gradually coke up thereby tending to change the pressure on the upstream side of the preheater. At the rates discussed herein, this pressure is approximately 20 to 30 p. s. i. g. with a clean coil and it is therefore necessary to blow the coil when the pressure reaches approximately 100 p. s. i. g. With the arrangement shown and discussed an open valve 26 indicates the necessity for blowing the coil so as to reduce the resistance to flow of oil therethrough. It is feasible to position preheater 24 at any place in the flow line through which all of the oil flows, but it is preferred to locate this preheater as shown in the drawing in order to obtain the cooperative effect between the heater and valve 26.

The practice of metering a side stream to determine total flow is conventional but the system described herein offers several distinct advantages which are not provided by conventional processes and apparatus. Each individual system of the conventional type has to be calibrated separately since its operation is dependent on the ratio of friction in the main and side streams. It has been found in plant operation that this ratio is constant only over a narrow operation range; therefore, the system would have to be recalibrated for several incremental ranges. The system of the invention can be accurately pre-set for any desired constant flow through the main orifice by selecting the desired control pressures or the pressure differential across the orifice. The system also provides relatively large movement of the flow indicator for a small change or correction in flow rate which is not possible with conventional split-flow systems and processes.

Figure 2 indicates the pressure-flow relationship discussed in the illustration of the process and indicates that as flow through the main orifice 20 rises to 250 g. p. h., the pressure is built up in line 16 to 175 p. s. i. g. and additional flow from 250-350 g. p. h. is through orifice 32, with pressure of 175 p. s. i. g. in lines 16 and 18 remaining constant under all flow conditions in excess of 250 g. p. h.

The flow control system described is applicable to any use requiring accurate flow control of either a gaseous or liquid stream, particularly in chemical processes where the fluid is one of the reactants, and in other chemical treating processes.

Certain modifications of the invention will become apparent to those skilled in the art and the illustrative details disclosed are not to be construed as imposing unnecessary limitations on the invention.

I claim:

1. A flow metering system for fluid flow comprising a first flow line having a flow-restricting orifice therein; a second flow line connected with said first flow line so as to form a shunt around said orifice; a flow control valve in said first flow line upstream of said second flow line; means providing a flow-restricting orifice in said second flow line; flow-recording means connected with aforesaid means; flow control means in said second flow line upstream of the orifice therein responsive to a predetermined pressure in said first flow line intermediate the orifice and flow control valve therein being normally closed and adapted to open on increase of said pressure; a second flow control means in said first flow line downstream of said second flow line responsive to the pressure in said second flow line intermediate said second flow control means and the orifice in said second flow line and adapted to maintain a predetermined pressure therein.

2. The system of claim 1 including a fluid heater in said first flow line upstream of said second flow control means and downstream of the return of said second flow line.

3. A flow metering system for fluid flow comprising a flow line having a constriction therein; a shunt line around said constriction having a flow-restricting element therein; a flow control valve in said flow line upstream of said shunt line; a flow control element in said shunt line upstream of the flow-restricting element therein responsive to the pressure in said flow line intermediate said valve and said constriction and adapted to open when a predetermined pressure is reached in said flow line intermediate said valve and said constriction so as to maintain said predetermined pressure; means in said flow line downstream of said shunt line for maintaining a predetermined backpressure in said flow line downstream of said constriction; and flow recording means responsive to the pressure drop across said flow-restricting element.

4. The system of claim 3 including an indirect heat-exchanger in said flow line intermediate the return of said shunt line and the means therein for maintaining a predetermined back-pressure.

5. A flow-metering system for fluid flow comprising a first flow line having an orifice therein for restricting fluid flow; a flow control valve upstream of said orifice; a second flow line connecting with said first flow line intermediate said orifice and said valve and also downstream of said orifice thereby forming a shunt around said orifice; means providing an orifice in said second flow line for restricting fluid flow; a back-pressure valve in said second flow line upstream of the orifice therein, said back-pressure valve having pressure-responsive flow-control means connected with said first flow line intermediate said orifice and said flow control valve; a second back-pressure valve in said first flow line downstream of the orifice therein having pressure-responsive flow-control means connected with said first line intermediate the orifice therein and said second back-pressure valve; and a flow-recording meter operatively connected with the orifice in said second line.

References Cited in the file of this patent

UNITED STATES PATENTS

| | | |
|---|---|---|
| 742,136 | Tilden | Oct. 20, 1903 |
| 1,308,569 | Wylie | July 1, 1919 |